Patented May 3, 1938

2,115,716

UNITED STATES PATENT OFFICE 2,115,716

PLASTICIZED PROLAMINE BASE COMPOSITION

Donald W. Hansen, Decatur, Ill., assignor, by mesne assignments, to Prolamine Products Incorporated, Dover, Del., a corporation of Delaware No Drawing. Application December 11, 1933, Serial No. 701,863

9 Claims. (Cl. 106—38)

The present invention relates to a composition of matter suitable for coatings, and for manufacture of films and filaments. It has particular reference to the manufacture of thin, strong, transparent sheets or films suitable for wrapping food, packages and other articles.

The invention employs as a base material a particular type of protein known as the prolamines. The prolamines are known as the alcohol soluble proteins. When prepared by alcoholic extractions and by driving off the solvent, the residual prolamine is a hard horny mass. In general the prolamines are characterized by insolubility in water, in absolute alcohol and in other neutral solvents, but are soluble in relatively strong aqueous alcohols of, for example, 70% to 80% alcohol. The common prolamines are obtained from seeds of the cereal grains, and are designated zein from corn, gliadin from wheat, and hordein from barley. This general source and classification of prolamines is not exclusive, for it is known that there are other so-called prolamines, such as an alcohol-soluble protein found in milk, which however has chemical characteristics somewhat different. In referring herein to prolamines it is to be understood that prolamines from cereals are specifically intended, and such other alcohol-soluble proteins as have similar behavior.

The prolamines usually occur in grains in the gluten, and are extractable therefrom by an aqueous alcohol solvent. For example corn gluten may be extracted with a solvent mixture of 75% ethyl alcohol and 25% water, to remove the prolamine "zein". The methods of preparing and purifying zein and other prolamines are well known and form no essential part of the present invention. However, the said known processes may be modified so that they are conducted in a manner to provide a suitable alcoholic solution of prolamine as a starting material for practice of the present invention.

Prolamines have heretofore been employed as base materials for coatings, films and filaments. Reference is made to the U. S. Patent No. 1,316,854 to Ostenberg wherein such products are described. The products therein described are of limited utility and do not adequately meet the present day requirements. The Ostenberg films, it is stated, may be rendered pliable by use of numerous suggested plasticizers. None of the plasticizers mentioned are adequate for making a permanent film which can be wet without blushing and then be dried without damage or alteration. Some of the plasticizers mentioned are removed from the film by water. Others are not fully compatible with the mass in manufacture and separate out, thus preventing the formation of transparent and homogeneous masses. A bad feature of all such suggested plasticized prolamine films is a blushing or whitening when wet, or when subjected to high humidity.

The applicant has discovered that there are two outstanding and rather independent problems presented by these prior art films. The first and probably the most important is the plasticizing problem. Although many materials are known generally as "plasticizers", because they have that function with some specific base material, it has been discovered that these materials are not universally suitable as plasticizers for the prolamines. This is particularly true because the prolamines in the plastic compositions employed in this invention involve both water and alcohol as a mixed solvent, and many of the socalled "plasticizers" of other specific fields have little or no solubility in such a solvent mixture, even in the presence of dissolved prolamine. It has also been discovered that many of these so-called "plasticizers" of other fields which do have a suitable solubility, do not have a plasticizing function or are incompatible when used with a prolamine base. It has also been discovered that numerous materials which successfully plasticize a prolamine base are not permanent in the composition inasmuch as the substance may volatilize away, oxidize, or be leached out on contact with water. Consequently the first problem has been the search for practical permanent plasticizers and especially those which permit forming transparent films.

The second problem presented in the field of this invention is the prevention of spotting, whitening, or blushing when the film or final composition is exposed to water or to high humidity, especially at elevated temperatures. Numerous addition agents have been found, and also certain specific treatments, which minimize or prevent this blushing. It has also been discovered that the anti-blushing agents function in the plasticized prolamine mass, rather independently of the type of plasticizer used. However, this statement is made with the reservation that the degrees of functioning of the plasticizer and of the anti-blushing agent may be somewhat altered by the specific composition of the whole mass involved in the manufacture. A certain type of material has also been discovered which acts both as a plasticizer and as an anti-blushing agent.

Other problems have been encountered in the formation of specific shapes, such as films and filaments, and it is contemplated that other materials may be added to aid in the mechanical operations, such as stripping from smooth surfaces. Materials which are employed for such purposes act substantially independently of the plasticizer and of the anti-blushing agent.

The primary object of the present invention is the formation of a prolamine base composition capable of formation into films, filaments or coatings, which are permanently plasticized so as to be flexible and pliant, which may be and preferably are transparent, which may be essentially moisture resistant, and unalterable in appearance by water or moisture, and which are tough and strong.

A particular object of the invention is the use of a plasticizer which can be permanently retained by the composition under substantially all the conditions of normal usage for such products, and which can be incorporated in the product in homogeneous distribution for the purposes of not impairing transparency, or of effecting transparency.

Another object of the invention is the attaining of the foregoing object in a composition which resists change or blushing when subjected to water or high humidity.

Another object of the invention is the use of a single material which acts as a plasticizer and also as an anti-blushing agent.

Various other and ancillary objects and advantages of the invention will be apparent from the following description of the invention as hereinafter given in detail in showing numerous ways in which the invention may be carried out in practice.

In the following portions of the specification the above mentioned problems are fully discussed and methods for solving them are given. The entire description constitutes one process in which many combinations of materials may be made as shown by the several examples. In this particular application the objects and the invention claimed relate to the plasticizing problem. In my copending application Serial No. 701,864, filed December 11, 1933, now U. S. Patent No. 2,102,- 623, issued December 21, 1937, having generally similar disclosure, the objects and the invention claimed relate to the problem of blushing. In each instance it is contemplated that each of the two inventions may be used both with and without the other.

Where I am concerned with plasticizing I avoid the use of those plasticizers which are not compatible with the whole composition throughout all the stages of manufacture and through the final product, such as certain fats, waxes, resins, oils, and the like. I also avoid those plasticizers which are compatible, namely, the polyatomic alcohols, such as sugar and glycerol, which are removed by water from the plasticized product. Glycerol in particular is hygroscopic and it synerizes out of the mass. I also avoid those phenolic substances such as phenol and naphthol, which make the mass odorous, or which slowly volatilize from the plasticized mass. Some phenolic substances are slightly poisonous and such are to be avoided as undesirable in some instances. I also avoid soaps of the water-soluble type which are removable from the plasticized mass, as a result of which removal a plasticized film will disintegrate when wet.

Preparation of prolamine

The prolamine may be prepared from gluten by extraction with a suitable solvent, preferably an aqueous alcohol. Ethyl alcohol 70% and water 30% has been recommended as the preferred and practical solvent, but higher alcohols and different strengths may be used. For certain purposes I prefer to use 80% to 85% ethyl alcohol, remainder being water. The preferred solvent is used for zein until it contains about 10% zein and 90% solvent. Part of the solvent may then be evaporated to concentrate the prolamine. For zein, the concentration is usually increased to 12% to 20% zein in the aqueous alcohol solution. In many instances a standard composition has been employed which is referred to hereinafter as the "standard base solution" and it is substantially as follows:

|  | Percent by weight |
| --- | --- |
| Zein | 12 |
| Ethyl alcohol 80%; water 20% | 88 |

In preparing the prolamine from gluten, certain purification processes may be practiced. The various gluten sources of the prolamines are treated in substantially the same way, as illustrated by the process for zein.

As ordinarily prepared a zein solution, obtained by an aqueous alcoholic extraction of gluten, is highly colored due to coloring agents, possibly carotene or xanthophyll, or both, which occur in the corn gluten. By preliminarily extracting dry gluten with 95% ethyl alcohol, such coloring agents may be sufficiently removed so that upon a subsequent extraction with an 80% to 85% ethyl alcohol (remainder is water) a much less colored solution of zein is obtained. This may be practically completely decolorized by warming with about 2% of high grade decolorizing carbon, based on the quantity of solution. The extraction may be conducted until there is 10% of zein in the solution. This may be concentrated to a higher content, such as from 12% to 20%. In general practice I have used a 12% solution.

Leveling solvents

The standard base solution which is used, having ethyl alcohol and water as the solvent mixture, is inadequate as a solvent for evaporation to form a commercial film. The alcohol evaporates more readily than the water and a stage may be readily reached where the residual solvent substance will be insufficient to keep the zein in solution. Precipitation of zein before drying of the film will thus make a translucent film.

I therefore alter such a solvent mixture for making films by evaporation to one which will maintain the zein, or other prolamine, in solution until the film is dry. This is preferably done by adding one or more different solvents. In practice, the added substance of course must be one which will be compatible with the plasticizer, when that is used, and with the anti-blushing agent, when such is used. There is wide choice of additional solvents that may be added. As a rule, they are solvents having a higher boiling point than ethyl alcohol, which are miscible to some extent with water. I have found that the most desirable added solvent should have a boiling point not over about 135° C., and preferably lower, in order to give a fairly quick drying time in film formation. However, this does not signify that higher boiling solvents may not be used.

In order to test the utility of any specific material as an added solvent for zein for film formation, the following procedure has been adopted. To 10 parts by volume of standard zein base solution, 2 parts by volume of the solvent are added. The solution is poured on a glass surface to form a film and dried at about 60° C. Its effect can thus be ascertained. Various degrees of cloudiness may be found during the drying process, and at the end of the process. However, limited cloudiness in this test does not indicate unsuitability of a particular solvent, for the reason that in the presence of a plasticizer and/or anti-blushing agent, the cloudiness may not occur. In the absence of plasticizer and anti-blushing agent, the following solvents give no cloudiness in the final film and are highly useful.

Normal propyl alcohol
Isopropyl alcohol
Normal butyl alcohol
Isobutyl alcohol
Secondary butyl alcohol
Tertiary butyl alcohol
Normal butyl carbinol
Isobutyl carbinol
Secondary butyl carbinol
Diethyl carbinol
Dimethyl-ethyl-carbinol
Methyl-propyl-carbinol
Methyl isopropyl carbinol
Ethylene glycol monomethyl ether
Ethylene glycol monoethyl ether
Ethylene glycol monobutyl ether
Trimethylene glycol monoethyl ether
Propylene glycol monoethyl ether
Ethylene glycol monobenzyl ether
b-b'-Dihydroxy ethyl ether
b-Ethoxy b'-ethoxy ethyl ether
Normal butyl a-hydroxy isobutyrate
Ethylene glycol monoacetate
b-Hydroxy ethyl formate
Ethyl a-hydroxy isobutyrate
Diacetone alcohol Other solvents have been tried which give slight cloudiness in the film after complete drying. These include:

Dimethyl-normal-propyl carbinol
Heptyl alcohol
Ethyl lactate
Diacetin

It is to be understood that although I have divided the solvents into two classes by an arbitrary test, it does not signify that they constitute two types. According to variations in the zein base solution, the presence of plasticizers, the presence of anti-blushing agents, and different proportions of the solvent to the zein base, a particular solvent may lie in one class or another, as above given. In fact some of the solvents which are listed as giving final clear films, have shown cloudiness in the preliminary drying stages. The purpose of the classification here given is to show that many solvents are suitable, and that one must select a solvent which is proper for the particular composition at hand, and the result desired.

Furthermore, it is also to be understood that the last given list is not excluded from use in the invention, since other factors than those specified may alter the results. For example, other factors are, use of a base solution other than standard, use of a base other than zein, use of a more concentrated base solution, use of a different drying temperature, use of a different proportion of solvent to base solution, use of a different alcohol in the base solution, use of a plasticizer in the solution, and use of an anti-blushing agent in the solution.

For convenience of identification I refer to this additional solvent as a "leveling solvent" for the reason that its function is to level the rates of evaporation of water and volatile solvent so that the unevaporated residue remains as a satisfactory solvent mixture to carry out the purposes of the invention.

These leveling solvents also have other important effects on the film which are pertinent to the present invention. With some leveling solvents the dried film strips readily from the glass, and with others it strips with difficulty from the glass. Solid metal surfaces as well as glass surfaces are used for stripping, and the results with the two are not always comparable for a particular composition. The choice of solvent material may sometimes be dictated by the question of stripping from a particular surface.

Still another effect of the leveling solvent is in the surface presented by the film. Some solvents in the test described yield a smooth surface, while others yield a rough or pebbly surface, herein and technically described as "orange peel". In the test described the following solvents give a smooth surface, which is the most desirable surface for most uses of the film: normal propyl alcohol, isopropyl alcohol, normal butyl alcohol, tertiary butyl alcohol, ethylene glycol monomethyl ether, trimethylene glycol monoethyl ether, propylene glycol monoethyl ether, beta hydroxy ethyl formate, and ethyl alpha-hydroxy-isobutyrate.

In choosing a leveling solvent for commercial purposes I recommend an alcohol or glycol ether which is fairly soluble in water, such as a propyl or butyl alcohol. Many of the most satisfactory solvents which I have used boiled in the range 100° to 115° C. Ethylene glycol monomethyl ether and ethylene glycol monoethyl ether are also recommended.

PLASTICIZER

In experimenting with plasticizers it has been found that very widely different types of materials have the desired plasticizing action, and that, sometimes, very closely related types of materials have diverse plasticizing properties. Consequently, in describing the plasticizers that I have discovered, they are classified in chemical types, without signifying that every member or group falling within the type is suitable. Within the types there are several groups of substances, and, as the groups are herein identified, it is usual that the members within the groups have the plasticizing properties. Within the various groups the known species are named without implying that species not listed are not suitable. Therefore, it is to be noted that in discussing plasticizers, I may refer to types, groups, or species.

I have combined the diverse plasticizers into the following types:

Type 1. Esters of hydroxylated organic acids.
2. Esters of fatty acids and polyhydric alcohols.
3. Sulphonamides.
4. Esters of dihydric alcohol monoalkyl ethers.
5. Amino acid esters.
6. Derivatives of carbamic acid and substituted urea.
7. Glyceryl monoethers.

Each type will be hereinafter particularly discussed. It is to be understood that each species hereinafter listed or which falls within any type, must, to be considered a plasticizer, be soluble in the zein solution particularly involved, and must not be precipitated from solution in the process of drying to form the film.

Type 1

Esters of hydroxylated organic acids

The above type includes groups of aliphatic acids and aromatic acids. Hydroxylated aliphatic acid species entering this type include tartaric and citric. Salicylic acid is an hydroxylated aromatic species entering this type. Both alkyl and aralkyl esters of the hydroxylated acids are useful. The following species are named: di-butyl tartrate, di-isoamyl tartrate, tri-butyl citrate, di-benzyl tartrate, butyl salicylate.

Di-butyl tartrate is a preferred plasticizer, but mixtures of the various ones may be used.

Type 2

Esters of fatty acids and polyhydric alcohols

Among the polyhydric alcohols entering into groups under this type are the trihydric alcohols, such as glycerol, and the dihydric alcohols, such as ethylene glycol, propylene glycol, and trimethylene glycol. Among the fatty acids entering groups under this type are the hydroxylated fatty acids, the unsaturated fatty acids, and the saturated fatty acids. Suitable species within the above type are monoricinolein, monolinolein, monomyristin, monolaurin, ethylene glycol monolaurate, ethylene glycol monomyristate. In the saturated fatty acid types those having from 12 to 14 carbon atoms are preferred. Mixtures of any of the above groups may be used where they are compatible. Sometimes these plasticizers are mixtures as commercially prepared from fatty acids.

It is preferred in this type that but one hydroxyl group of the polyhydric alcohol should be esterified with the fatty acid. Hence the preferred group is designated "mono esters". However, certain diesters are suitable. It is not here-intended to means that other esters such as diglycerides and triglycerides are not plasticizers, but some are per se not compatible with zein, and separate out. Hence such ones are not plasticizers of the present invention.

Type 3

Sulphonamides

The above type includes as groups the aralkyl, aryl and alkyl sulphonamides, and their N-aryl and N-alkyl derivatives. In this type the amino group (—NH$_2$) may be substituted by other radicals forming groups in the above type of sulphonylmethylamides, sulphonyldimethylamides, sulphonylethylamides, sulphonyl - di - n - butylamides, sulphonanilides and sulphonyl-n-heptylamides. Suitable species are:

(a) Toluenesulphonamide
(b) Toluenesulphonylmethylamide
(c) Toluenesulphonyldimethylamide
(d) Toluenesulphonylethylamide
(e) Toluenesulphonyldi-normal-butylamide
(f) Toluenesulphonanilide
(g) Toluenesulphonylmethylanilide
(h) Benzenesulphonamide
(i) Benzylsulphonamide
(j) Benzylsulphonanilide
(k) Benzylsulphonyl-normal-heptylamide
(l) Ethanesulphonamide
(m) Ethanesulphonyl-normal-butylamide Of these, the item "d" may be used as one of the individual ortho, meta, and para isomers or as a mixture of the isomers, such as the ortho and para. Item "a" gives especially great tensile strength to a certain film in comparison with others in the list.

Type 4

Esters of dihydric alcohol monoalkyl ethers

In the above type the acid group of the ester may be aliphatic or aromatic, examples respectively being lactate or phthalate. The groups in this type may include a dihydric alcohol such as ethylene glycol or its derivatives, propylene glycol, or trimethylene glycol. Species under this type are the phthalate of ethylene glycol monoethyl ether, and the lactate of ethylene glycol monoethyl ether. These are esters of ethylene glycol monoethyl ether, or more broadly expressed, they are esters of a glycol monoalkyl ether.

Type 5

Amino acid esters

In the above type, both the aryl and alkyl esters may be used, but alkyl esters are preferred, for example the esters of glycine and its homolog alanine. Suitable species are glycine ethyl ester and alanine ethyl ester.

It is a characteristic of this type of plasticizer that it also acts as an anti-blushing agent of which others are hereinafter described. The dual function of this type of agent as a plasticizer and as an anti-blushing material is perhaps somehow dependent upon the fact that amino acid is protein in nature, like the prolamine base. As will be noted later a salt of an alkyl ester of amino acid will also function as an anti-blushing agent. When used for its dual functioning this material should be present in quantity sufficient for each function. As will appear in the following examples, suitable plasticizing results are obtained using 2 parts of plasticizer for 9 parts of zein or other prolamine, while suitable anti-blushing results are obtained with only 2% to 3% of anti-blushing agent, based on prolamine. Therefore, the material for dual functioning should be used in a plasticizing quantity.

Type 6

Derivatives of carbamic acid and substituted urea

This type of agent is closely related in chemical structure to the amino acids of Type 5. The type has two distinct groups of which carbamic acid and urea are the bases:

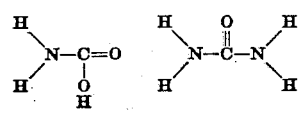

Carbamic acid    Urea

Derivatives of these basic substances are the effective plasticizers. The aliphatic esters of carbamic acid such as ethyl carbamate, is one group under this type, and similar esters of other derivatives form another group, such as ethyl N-phenyl carbamate. In the urea group the derivatives of urea are the functional plasticizers, of which many varieties are possible. Effective species are ethyl carbamate, ethyl N-phenyl carbamate, and symmetrical diethyl-diphenyl-urea.

Type 7

Glyceryl monoethers

This type of plasticizer may include three groups namely: glyceryl monoalkyl ethers, glyceryl monoaryl ethers, and glyceryl mono aralkyl ethers. Suitable species are alpha glyceryl methyl ether, alpha glyceryl phenyl ether, alpha glyceryl cresyl ether, and alpha glyceryl benzyl ether.

ANTI-BLUSHING

In experiments to prevent blushing, or whitening in contact with water or high humidity I have discovered that prevention is possible by use of certain special agents or by special treatments in the absence of such a special agent. Because the film is dried from a solvent containing some water, it is more peculiarly susceptible to this blushing action than some other types of films.

I have discovered that when a prolamine film has this property of blushing, the property may be destroyed by soaking the film in water thus to exhaust the latent power to blush, and then drying the film. Thereafter it will not blush a second time on wetting or exposure to high humidity. The film may be soaked in water for 10 minutes at 125° F., although the time and temperature are not critical. The action may be hastened by a small quantity of acid or alkali in the water, such as .1% hydrochloric acid or sodium hydroxide. The acid or alkali may then be washed out.

However, it is not a desirable process from a commercial point of view to make a film, by a drying process, then wet the film, and then dry it again. The practical objective is to form a non-blushing film originally. I have discovered that there are a number of agents which may be added to the film, which I herein designate as "anti-blushing" agents. The characters of the various agents are very diverse, and so far as I have been able to determine there is little relation between them which permits of a single classification along molecular structural lines. Hence, I have divided them into several "classes" and within the "classes" there are "groups" of materials which function. Particular species are also identified.

Class A

Amino acid esters or their salts

In the above class the aryl or alkyl esters of the amino acids form two groups and the amino acid ester salts with either mineral or organic acids form another group. Suitable species are: glycine ethyl ester, glycine ethyl ester hydrochloride, alanine ethyl ester, alanine ethyl ester acetate. As noted heretofore under Type 5 the ester (not in salt form) is also a plasticizer.

Class B

Amino guanidine or its salts

In the above class the amino guanidine base falls in one group, and the salts of it fall in another group. Suitable species are amino guanidine, and amino guanidine hydrochloride.

Class C

Semi-carbazide or its salts

Closely related to the Class B is the Class C, it being known that amino guanidine when warmed with acid yields semi-carbazide. The base itself falls in one group and its numerous salts in another group. Suitable species are semi-carbazide and semi-carbazide hydrochloride.

Class D

Organic amino alcohol salts

The discovery of materials in this group has been made jointly by the applicant with Paul R. Shildneck and is described and claimed in our copending application Serial No. 701,866, filed December 11, 1933. For the sake of completeness the class is here listed. In this class when the organic amino alcohol is aliphatic, the agent falls in one group. When the salt is of an aliphatic acid the agent is in a second group. The preferred species are aliphatic amino alcohol salts with aliphatic acids, and hence these combine the two groups. Suitable species are monoethanolamine acetate, monopropanolamine acetate, and monopropanolamine lactate, and isobutanolamine acetate.

Protein fixing

In general, the protein substances, like gelatin, are treated with some fixing agent or hardening agent, such as formaldehyde, alum, chromic acid, etc. While these are sometimes termed "hardening" agents, the real function is "fixing" the protein. I prefer not to call them hardening agents in this invention, because to some extent the plasticizers are sometimes considered as "softening" agents, and I do not wish it to be understood that the protein fixer and the plasticizer are antagonistic in function. The prolamines resemble other proteins in that they are similarly susceptible to the action of fixing agents. I prefer to use formaldehyde as a fixing agent, but others may be used. Glyoxal is also suitable for zein. It is not necessary to use a fixing agent to secure a film by the processes and with the agents herein described, but if a fixing agent such as formaldehyde is not used, the resulting film will soften, swell or spot with water. Use of a fixing agent is therefore not essential merely to form a film, but it is practically essential in making commercial films which may be subjected to the action of water. I have also discovered that the ease of stripping cast films is usually dependent upon the use of formaldehyde as a fixing agent, although such use does not assure strippability. When such fixing agent is not used it is usually impossible to strip films from the common solid casting surfaces. Hence for adherent coatings it may be advisable to reduce or omit a fixing agent where its other functions are not desirably to be employed. In forming strippable films of laminated character, including a prolamine layer, as hereinafter described, and as described in my copending application Serial No. 701,865, filed December 11, 1933, the use or non-use of, and the regulation of the quantity of fixing agent may advantageously predetermine the character of the product.

Stripping film

Inasmuch as numerous combinations embodying the invention are possible, and because numerous smooth surfaces may be chosen on which to cast a film, it is not necessary to mention all the specific cases where the film may strip easily, or with difficulty. There is a heavy tendency for the film to adhere to glass when cast and dried thereon. For compositions which tend to adhere to a surface in forming films, a mercury surface may be employed to assure readily lifting the film after it is formed.

In order to permit easy stripping of the film from a solid surface, the glass or other surface may be first coated with a thin film of substance which is adherent to the prolamine film to be formed, and furthermore sufficiently non-adherent to the glass, metal or other surface so that the united films may be stripped together from such surface. Thus a dual film, or an apparently coated prolamine film is formed. Numerous materials may be used as a stripping film, but a cellulose ester or ether base film is preferred, as of cellulose acetate, cellulose nitrate, benzyl cellulose, or ethyl cellulose. The following formulas are suitable:

Formula A

| | Parts by weight |
|---|---|
| Alcohol soluble cellulose nitrate | 1 |
| Ethylene glycol monoethylether | 10 |
| Ethyl alcohol | 90 |

Formula B

| | Parts by weight |
|---|---|
| Cellulose acetate | 1 |
| Ethyl lactate | 10 |
| Acetone | 90 |

These solutions will dry in about 5 minutes if heated to 125° F. In practice I prefer to apply the solution to form a dry film about 0.00005 to 0.0001 inch in thickness. If it is too thin, it may dissolve in the solvents of the applied prolamine composition. It is to be understood that the thickness of the film above specified is given only by way of example and is not to be considered as any essential limitation. Formula A is preferred since it has the same solvents as the wet zein compositions, and one recovery system may be employed. Proofing agents may be added to the formula, in following the general disclosures of the Charch and Prindle U. S. Patents Nos. 1,826,697 to 1,826,699. Where formulas like those of Charch and Prindle are used for proofing compositions to be applied to a zein film, it is advisable to omit ethyl alcohol, or other alcohol, which is a quick solvent for zein, or it will cause the zein film to stretch and curl. This method of forming multiplex films and of using a preformed strippable film as a casting surface for a prolamine film is more particularly described and claimed in my copending application Serial No. 701,865, filed December 11, 1933, now U. S. Patent No. 2,070,596, issued February 16, 1937.

Additional substances

The present disclosure does not indicate that other substances may not be added to the solvent compositions of prolamines. As in other arts, certain modifying agents may be added. The question of possible addition is largely one of compatibility, not only in the presence of the solvent, but during evaporation of the solvent through the final drying. Insoluble materials such as pigments and filler may be added as desired.

Dyestuffs may be used in the mass. Butyl stearate up to about 5% on the basis of zein, may be added to give moisture transmission resistance. This may also be present in the nitrocellulose stripping film for the same purpose. I have also found that alcohol soluble nitrocellulose and phenol-formaldehyde condensation resins are compatible in small amount in a zein film.

THE PRODUCT

The product may be a smooth transparent film when suitably compounded for this purpose. It may be non-transparent according to what may be additionally incorporated into it. It may lack smoothness when specially so prepared as to present the orange-peel effect. In general however, the aim is to secure a flexible tough clear transparent film, which is permanently pliable, and resistant to water and humidity, both as to transmission of it, and as to alteration of the film.

In the manufacture of threads or filaments the more rigid requirements for the best films may be dispensed with, since the transparency and continuous surface characteristics become less important.

Numerous changes and modifications of the invention may be made as a result of the disclosure herein made, and a number of these are set forth in the accompanying examples. It is not necessary that the plasticizer or the anti-blushing agent each be a single material. Numerous species of each have been named. Mixtures of plasticizers, or of anti-blushing agents may be used insofar as the mixed ones are compatible with each other, and insofar as the mixture is compatible with the other ingredients for the film, or compatible in process.

EXAMPLE 1

Zein—Type 1—Class D

To 75 parts by weight of a 12% zein solution in a solvent consisting of 70% ethyl alcohol and 30% water, or to any equivalent solution, I may add as a leveling solvent 10 parts by weight of ethylene glycol monoethyl ether. As a plasticizer I may add 2 parts by weight of dibutyl tartrate. As an anti-blushing agent, I may add on the basis of zein 2% to 3% of any of the agents mentioned in Classes A to D such as Class D for example. This may be a salt of monoethanolamine or monopropanolamine, such as an acetate or lactate salt thereof.

In addition there is added protein fixative such as 2.5 parts by weight of 37% formaldehyde solution, or a small quantity of glyoxal.

The resulting mixture may be extruded as a film or filament, or coated onto a surface so that on drying the desired formation takes place. For film formation it may be spread on mercury, or on polished metal, or on glass, or on a coated surface, for example a polished plate coated with an easy-stripping film of cellulose ester base, which is, however, mutually adherent with the zein film.

EXAMPLE 2

Zein—Type 2—Class A

To 75 parts by weight of a 12% zein solution in a solvent consisting of 70% ethyl alcohol and 30% water, or to any equivalent solution, I may add 10 parts by weight of secondary butyl alcohol as a leveling solvent. As a plasticizer I may add 2 parts by weight of material from Type 2, such as monoricinolein, monolinolein, monomyristin, and monolaurin, the monoglycerides being preferred. As an anti-blushing agent, I may add on the basis of zein 2% to 3% of any of those above named in Classes A to D, such for example as Class A. This may be glycine ethyl ester, alanine ethyl ester, or salts of these such as the hydrochloride. A protein fixative is added such as 2.5 parts by weight of 37% formaldehyde solution.

The resulting mixture may be formed into film, filament or coated film as above described.

EXAMPLE 3

Zein—Type 3—Class B

To 75 parts by weight of a 12% zein solution in a solvent consisting of 70% alcohol and 30% water, I may add as a leveling solvent 10 parts by weight of ethylene glycol monoethyl ether. As a plasticizer I may add 2 parts by weight of material from Type 3 above, such as toluene sulphonyl ethylamide. As an anti-blushing agent I may add on the basis of zein 2% to 3% of material from Classes A to D, for example Class B, in the form of amino guanidine or its hydrochloride, the latter being preferred. In addition I add a protein fixative such as glyoxal, or such as 2.5 parts by weight of a 37% formaldehyde solution. The resulting mixture is formed into films, coats or filaments as above described.

EXAMPLE 4

Zein—Type 5—Class A

The present example is carried out like Example 1, with the exception that the plasticizer and anti-blushing agent are one and the same, as above noted, being in Type 5 and in Class A. Therefore, to 75 parts by weight of the basic zein solution described in Example 1 with the added 2.5 parts by weight of 37% formaldehyde solution as protein fixing agent, and with the added 10 parts by weight of ethylene glycol monoethyl ether, I may add 2 parts of ester from Type 5, such as glycine ethyl ester. The mixture is treated to manufacture final forms as disclosed in Example 1 and elsewhere.

EXAMPLE 5

Zein—Type 4—Class C

To 75 parts by weight of the zein base solution described in Example 1, with the added 2.5 parts by weight of the fixing 37% formaldehyde solution, and with an added 10 parts of ethyl lactate as a leveling solvent, I may add 2 parts by weight of plasticizer from Type 4, such as ethylene glycol monoethyl ether phthalate. As anti-blushing agent I may add material from Classes A to D such as 2% to 3% on the basis of zein, of semicarbazide, or its acid salt such as its hydrochloride, from Class C. The resulting mixture is used to make permanent forms, such as a film as heretofore described.

EXAMPLE 6

Zein—Type 6—Process for anti-blushing

To 75 parts by weight of the zein base solution described in Example 1, with the added 2.5 parts by weight of commercial 37% formaldehyde solution, and with an added 10 parts by weight of ethylene glycol monoethyl ether, I may add as plasticizer 2 parts by weight of material from Type 6, such as ethyl carbamate, but preferably symmetrical diethyl-diphenyl urea. If desired an anti-blushing agent may be added as described in the previous examples, but this may be omitted.

In the event of omitting the anti-blushing agent a film formed of the mass will blush on wetting, or on being subjected to high humidity. This undesirable action may be prevented by first soaking the originally dried film in water, say for 10 minutes at 125° F., and then drying, as above described with permissible modifications.

EXAMPLE 7

Gliadin—Dibutyl tartrate—Monoethanolamine acetate

*Preparation of gliadin.*—Wheat flour is mixed with alcohol and water for four hours in the amount of 400 grams of wheat flour to 150 cc. of water and 450 cc. of 95% ethyl alcohol. The suspension is filtered and the filtrate evaporated at reduced pressure to about 25 cc. in volume. Then 25 cc. of ethyl alcohol (95%) is added and evaporation continued until the volume is again about 25 cc. Add 5 cc. of butyl alcohol. The resulting solution contains about 10% of gliadin. As a protein fixative, 4 cc. of 37% formaldehyde solution is added. As a plasticizer 0.1 gram of dibutyl tartrate is added. The plasticizers suitable for zein may be substituted.

A small test portion of the solution when poured onto a glass plate and dried at 150° F. forms a film which, however, may not strip readily from the plate, and which will blush when wet with water. To the remainder of the solution, there may be added an anti-blushing agent. When 0.05 gram of monoethanolamine acetate is added, and the mass spread on a steel plate to dry, a film may be readily stripped from the steel surface. The film is flexible, transparent, clear, and does not blush when wet with water.

EXAMPLE 8

Hordein—Dibutyl tartrate—Monoethanolamine acetate

*Preparation of hordein.*—Barley is ground and screened through a No. 10 screen to remove the hulls. 280 grams of ground kernels are mixed with 150 cc. water and 450 cc. of 95% ethyl alcohol for four hours. The filtrate is extracted and treated and evaporated as described for gliadin in Example 7. The hordein solution may be brown due to natural coloring matter present. This may be removed by treatment with decolorizing carbon as described for zein.

The solution may be treated exactly as described in Example 7 for gliadin with the same character of results. It may also be treated as described for zein with similar results, using any of the plasticizers and any of the anti-blushing agents or treatments.

In the foregoing I have described two methods by which a non-blushing product may be obtained. On their face these may appear quite different, but when the action is fully contemplated it is readily to be understood that the water used to wet a blushable film is partly taken up at least in part by the film as water-of-rehydration. The film is therefore in a state somewhat comparable to that of an originally formed film having anti-blushing agent present, which state requires ultimate drying to form a non-blushable film. For reasons which depend upon certain theories now entertained regarding the mechanism of the organic-anti-blushing agents, I believe that the water treatment for anti-blushing and the addition of organic agents for the same result may be specifically different processes whereas other theories might be devised indicating that the functions are generally the same. Therefore, in order not to bind myself to any theory of action, I choose to consider the processes broadly as the same, because they eventually produce a non-blushing product. Therefore, by considering the water of re-hydration, however, it may act, as an anti-blushing agent when used in the manner described, I may broadly express the two processes as a single process.

Since the fixing agent prevents swelling or spotting of the prolamine composition when it is wet with water, and since the anti-blushing agent prevents spotting of the composition, it is practically essential for a commercial water-resistant film for both to be used together. According to some theories of the mechanism of the organic anti-blushing agents, to which I do not wish to bind myself, I believe that the fixing agent and the anti-blushing agent may work conjointly to effect the ultimate high degree of resistance to water and to high humidity.

From the foregoing description and examples of the invention it will be understood that the present invention relates generally to the prolamines, especially those from the common cereal grains: corn, wheat and barley. The present application is directed particularly to the use of suitable plasticizer, which may or may not also be an anti-blushing agent, both with and without the accompanying use of an anti-blushing agent or treatment. Although I have described many features of the process and product which may be part of the practical process of using the invention, it is to be understood that these features are more particularly described and claimed in other applications. In my copending application Serial No. 701,864, filed December 11, 1933, now U. S. Patent No. 2,102,623, issued December 21, 1937, there is described and claimed more particularly the anti-blushing treatment and agencies. In my copending application Serial No. 701,865, filed December 11, 1933, now U. S. Patent No. 2,070,596, issued February 16, 1937, there is described and claimed more particularly the feature of forming the prolamine film adherently to a previously formed strippable film to form a multi-layer film of which a prolamine is the base of one layer.

I claim:

1. A composition of matter useful in the form of films, filaments and coatings comprising a prolamine base, and an amino acid ester as a plasticizer and as an anti-blushing agent for avoiding the blushing effects produced by moisture upon the prolamine base composition in dry solid form.

2. A composition of matter useful in the form of films, filaments and coatings comprising a prolamine base, a protein fixing agent for said base, and an amino acid ester as a plasticizer and as an anti-blushing agent for avoiding the blushing effects produced by moisture upon the prolamine base composition in dry solid form.

3. A composition of matter useful in the form of films, filaments and coatings comprising a prolamine base, and a plasticizing quantity of amino acid ester, whereby such quantity also exerts an anti-blushing function for avoiding the blushing effects produced by moisture upon the prolamine base composition in dry solid form.

4. A composition of matter useful in the form of films, filaments and coatings comprising a prolamine base, and glycine ethyl ester to minimize blushing effects produced by moisture upon the prolamine base composition in dry solid form.

5. A composition of matter useful in the form of films, filaments and coatings comprising a prolamine base, a protein fixing agent for said base, and glycine ethyl ester to minimize blushing effects produced by moisture upon the prolamine base composition in dry solid form.

6. A composition of matter useful in the form of films, filaments and coatings comprising a prolamine base, and alanine ethyl ester to minimize blushing effects produced by moisture upon the prolamine base composition in dry solid form.

7. A composition of matter useful in the form of films, filaments and coatings comprising a prolamine base, a protein fixing agent for said base, and alanine ethyl ester to minimize blushing effects produced by moisture upon the prolamine base composition in dry solid form.

8. A composition of matter useful in the form of films, filaments and coatings comprising a prolamine base, and an amino acid ester as an anti-blushing agent for minimizing the blushing effects produced by moisture upon the prolamine base composition in dry solid form.

9. A composition of matter useful in the form of films, filaments and coatings comprising a prolamine base, a protein fixing agent for said base, and an amino acid ester as an anti-blushing agent for minimizing the blushing effects produced by moisture upon the prolamine base composition in dry solid form.

DONALD W. HANSEN.